(12) United States Patent
Balshi et al.

(10) Patent No.: US 10,959,812 B2
(45) Date of Patent: Mar. 30, 2021

(54) MULTI-FUNCTIONAL COPING

(71) Applicants: Thomas J. Balshi, Gwynedd, PA (US); Stephen F. Balshi, Chalfont, PA (US); Glenn J. Wolfinger, Fort Washington, PA (US)

(72) Inventors: Thomas J. Balshi, Gwynedd, PA (US); Stephen F. Balshi, Chalfont, PA (US); Glenn J. Wolfinger, Fort Washington, PA (US)

( * ) Notice: Subject to any disclaimer, the term of this patent is extended or adjusted under 35 U.S.C. 154(b) by 173 days.

(21) Appl. No.: 14/983,677

(22) Filed: Dec. 30, 2015

(65) Prior Publication Data
US 2017/0189141 A1    Jul. 6, 2017

(51) Int. Cl.
*A61C 8/00*    (2006.01)

(52) U.S. Cl.
CPC .................... *A61C 8/0001* (2013.01)

(58) Field of Classification Search
CPC .................................................. A61C 8/0001
See application file for complete search history.

(56) References Cited

U.S. PATENT DOCUMENTS

| | | | |
|---|---|---|---|
| 4,645,453 A | 2/1987 | Niznick | |
| 5,674,073 A | 10/1997 | Ingber et al. | |
| 6,464,500 B1* | 10/2002 | Popovic | A61C 8/0022 433/173 |
| 7,125,253 B2 | 10/2006 | Kitamura et al. | |
| 7,785,107 B2* | 8/2010 | Niznick | A61C 8/0022 433/173 |
| 8,377,106 B2 | 2/2013 | Brånemark et al. | |
| 8,851,890 B2* | 10/2014 | Streff | A61C 8/0001 433/173 |
| 10,383,708 B2* | 8/2019 | Bidra | A61C 13/0003 |
| 2007/0281279 A1* | 12/2007 | Chander | A61C 8/0001 433/173 |
| 2010/0151420 A1 | 6/2010 | Ranck | |

(Continued)

FOREIGN PATENT DOCUMENTS

| | | |
|---|---|---|
| EP | 2351536 A1 | 8/2011 |
| EP | 2462893 A1 | 6/2012 |

(Continued)

OTHER PUBLICATIONS

"Dental Implant Impressions",available on http://www.neoss.com/professionals/restorative/Dental-Implant-Impressions dated Dec. 29, 2014, 3 pages.

(Continued)

*Primary Examiner* — Yogesh P Patel
*Assistant Examiner* — Stephen R Sparks
(74) *Attorney, Agent, or Firm* — Inspired Idea Solutions Law Firm

(57) ABSTRACT

A multi-functional coping including a base with a channel for securing a rubber dam, and an engagement section for engaging an impression or for use as a scan body, or for use as a temporary cylinder in a provisional dental prosthesis. The channel may include a first seating surface that is substantially perpendicular to a longitudinal axis of the multi-functional coping. The multi-functional coping may include engagement grooves and wings in the engagement section, and a cutting groove between two parts of the engagement section.

14 Claims, 4 Drawing Sheets

(56) References Cited

U.S. PATENT DOCUMENTS

| | | | | |
|---|---|---|---|---|
| 2011/0217672 | A1* | 9/2011 | Wallace | A61C 17/08 433/94 |
| 2012/0135370 | A1 | 5/2012 | Ranck et al. | |
| 2014/0113252 | A1* | 4/2014 | Hung | A61C 8/0066 433/201.1 |
| 2015/0111175 | A1* | 4/2015 | Thome | A61C 8/0001 433/174 |
| 2015/0182309 | A1* | 7/2015 | Soler | A61C 8/0001 433/174 |
| 2016/0128655 | A1* | 5/2016 | Tomkoria | A61B 6/145 433/29 |
| 2016/0184068 | A1* | 6/2016 | Chodorow | A61C 1/084 433/71 |
| 2017/0202649 | A1* | 7/2017 | Bernhard | A61C 8/0048 |
| 2017/0367795 | A1* | 12/2017 | Bidra | A61C 13/0003 |

FOREIGN PATENT DOCUMENTS

| | | |
|---|---|---|
| WO | 2004/100822 A2 | 11/2004 |
| WO | 2013/150356 A1 | 10/2013 |
| WO | WO-2013150356 A1 * | 10/2013 ........... A61C 8/0001 |

OTHER PUBLICATIONS

"Direct Pick-up Snap-on Coping (Closed tray)", available on http://www.cortex-dental.com/co-8050 dated Dec. 29, 2014, 3 pages.

"Impression Coping: Overview", available on http://www.mis-implants.com/Products/Prosthetics/Impression-coping.aspx, dated Dec. 29, 2014, 2 pages.

"Indirect Short Transfer Coping (Closed tray)", available on http://www.cortex-dental.com/co-8080, dated Dec. 29, 2014, 3 pages.

"Indirect Transfer Coping (Open Tray)", available on http://www.cortex-dental.com/co-8065, dated Dec. 29, 2014, 3 pages.

"Certain Implant Lab Analog", available on http://shop.unident.se/index.php/certain-implant-lab-analog-10517.html, 2 Pages.

"DIEM®2", Solutions for Immediate Full Arch Rehabilitation in One Day, available on http://www.diem2.biomet3i.com, 15 pages.

Balshi, Thomas et al., A Patient's Guide to Dental Implants, 2003, Addicus Books Inc. Omaha Nebraska USA.

Barrero, Carlos et al. Fabrication of a Maxillary Implant Retained Overdenture Using an Existing Subperiosteal Implant: A Clinical Report, The Open Dentistry Journal, 2011, 5, 122-125. Available at www.ncbi.nlm.nih.gov/pmc/articles/PMC3145260/.

* cited by examiner

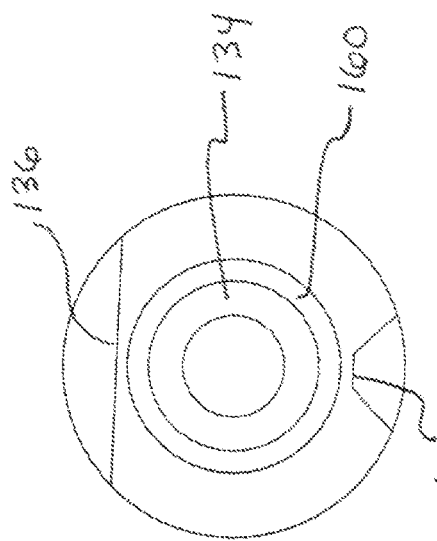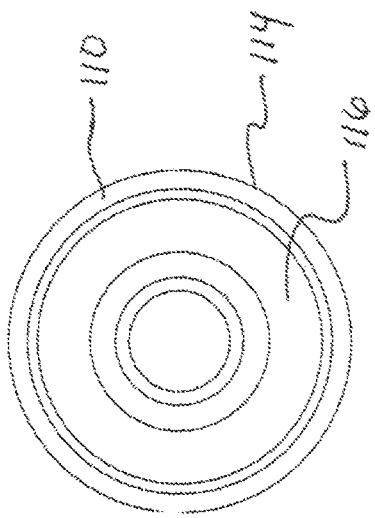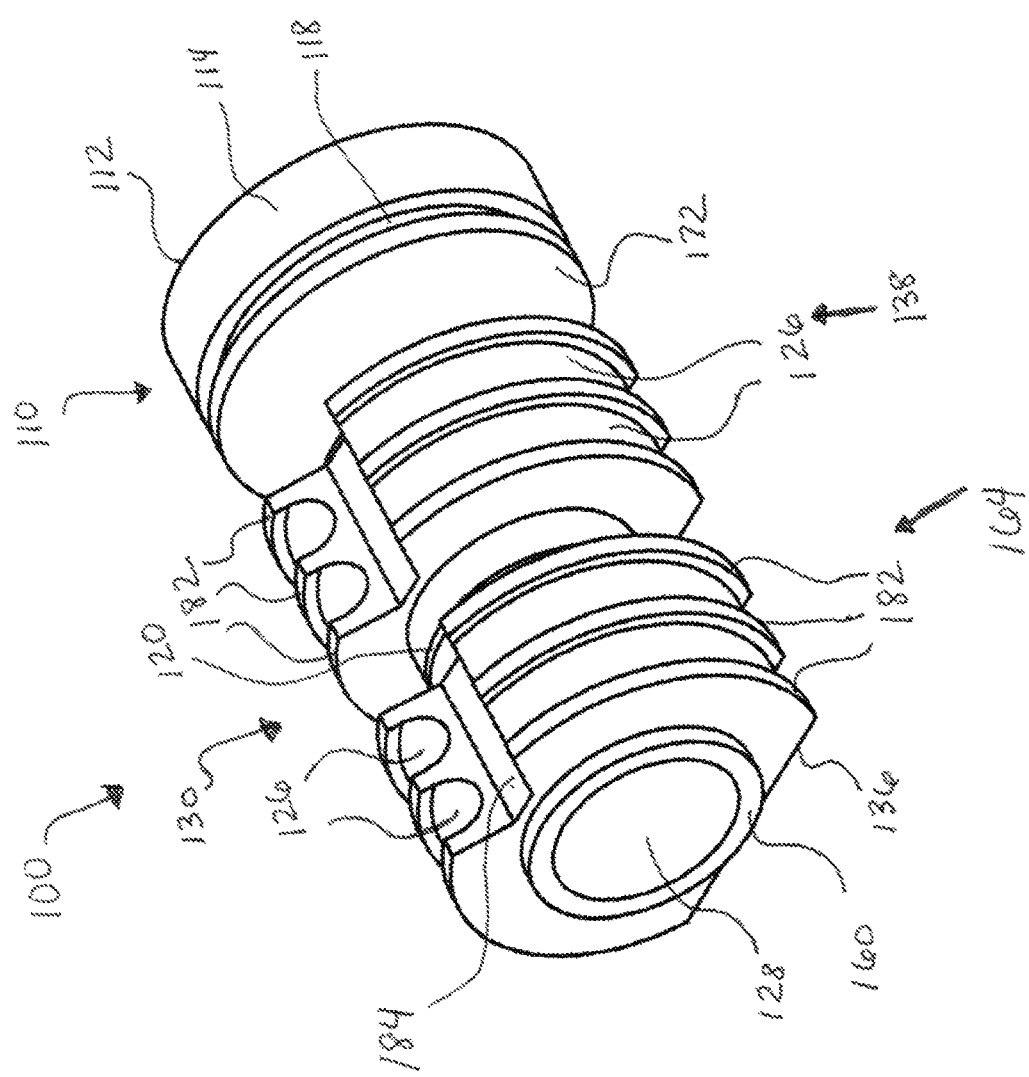

MULTI-FUNCTIONAL COPING

BACKGROUND

The disclosed subject matter relates to the field of dental implants, and to copings used for dental implants.

In recent years procedures using copings and other devices have been developed for using one or multiple implants to replace teeth with prosthetic devices. There is a need for an improved coping and methods of using an improved coping as summarized, discussed in detail, and claimed in the following text and accompanying illustrations.

SUMMARY

In embodiments of the described and illustrated copings, multi-functional copings and methods of using multi-functional copings are described. Such copings may include a base having a base interior and a base exterior. The base interior may be formed in relation to an implant or an abutment for close fit with the implant or the abutment. The base exterior may be formed with a channel around the base exterior.

An engagement section may include a first portion connected to the base, and a second portion connected to the first portion. The first portion and the second portion, or either of them, may include an engagement groove, a first flat side and a second flat side. In some embodiments the first portion and the second portion or either of them may include an engagement groove, a flat side and a notched side. The notched side may have a v-shaped notch in the first portion, the second portion, or in both sections. The engagement section may include an engagement interior and an engagement exterior. The engagement groove on the first portion and the second portion may be on the engagement exterior. The engagement interior may include an opening at a first end connected to the base interior to allow a fastener to connect the multi-functional coping to the implant or the abutment. The first flat side and the second flat side may be on opposite sides of the first portion and the second portion, relative to the longitudinal center axis. Alternatively, the flat side and the orientation notch may be on opposite sides of the first portion and the second portion, relative to the longitudinal center axis. The engagement section may include a variable wall thickness between the engagement interior and the engagement exterior. The variable wall thickness may include a cutting groove between the first portion and the second portion. The variable wall thickness may be the least thick at the cutting groove.

The channel may include a first seating surface and a second seating surface that may be substantially perpendicular to a longitudinal axis of the multi-functional coping. The base may include a sloped portion next to the first portion, and the base exterior may include a round shape. In some embodiments the base interior may be a multi-sided shape. The first seating surface and the second seating surface may be edges of the channel having a width, and the width may be approximately equal to a thickness of a rubber dam.

A multi-functional coping in some embodiments may include a base with a channel for securing a rubber dam, and an engagement section with multiple uses including engaging an impression, or for use as a scan body, or for use as a temporary cylinder in a provisional dental prosthesis. The channel may include a first seating surface that is substantially perpendicular to a longitudinal axis of the multi-functional coping.

The following detailed description includes references to the accompanying illustrations which form a part of this detailed description. Example embodiments are described in enough detail to enable those skilled in the art to practice the present subject matter. However, it will be apparent to one of ordinary skill in the art that the present invention may be practiced without some of these specific details. In other instances, well-known methods, procedures and components have not been described in detail so as not to unnecessarily obscure aspects of the embodiments. The embodiments can be combined, other embodiments can be utilized, or structural and method of use changes can be made without departing from the scope of what is defined and claimed. The following detailed description is, therefore, not to be taken as a limiting sense, and the scope is defined by the appended claims and their equivalents which are to be understood in their broadest possible sense.

In this document, the terms "a" or "an" are used, as is common in patent documents, to include one or more than one. Furthermore, the term "or" is used to refer to a nonexclusive "or," such that "A or B" includes "A but not B," "B but not A," and "A and B," unless otherwise indicated.

BRIEF DESCRIPTION OF THE DRAWINGS

Embodiments of the described apparatus are illustrated by way of example in the figures of the accompanying drawing sheets, in which like references indicate similar elements and in which:

FIG. 1 is a perspective view of a multi-functional coping according to some embodiments;

FIG. 2 is a top view of a multi-function coping according to some embodiments;

FIG. 3 is a bottom view of a multi-function coping according to some embodiments;

DETAILED DESCRIPTION

Implant and Prosthesis Procedure

Figure 4:
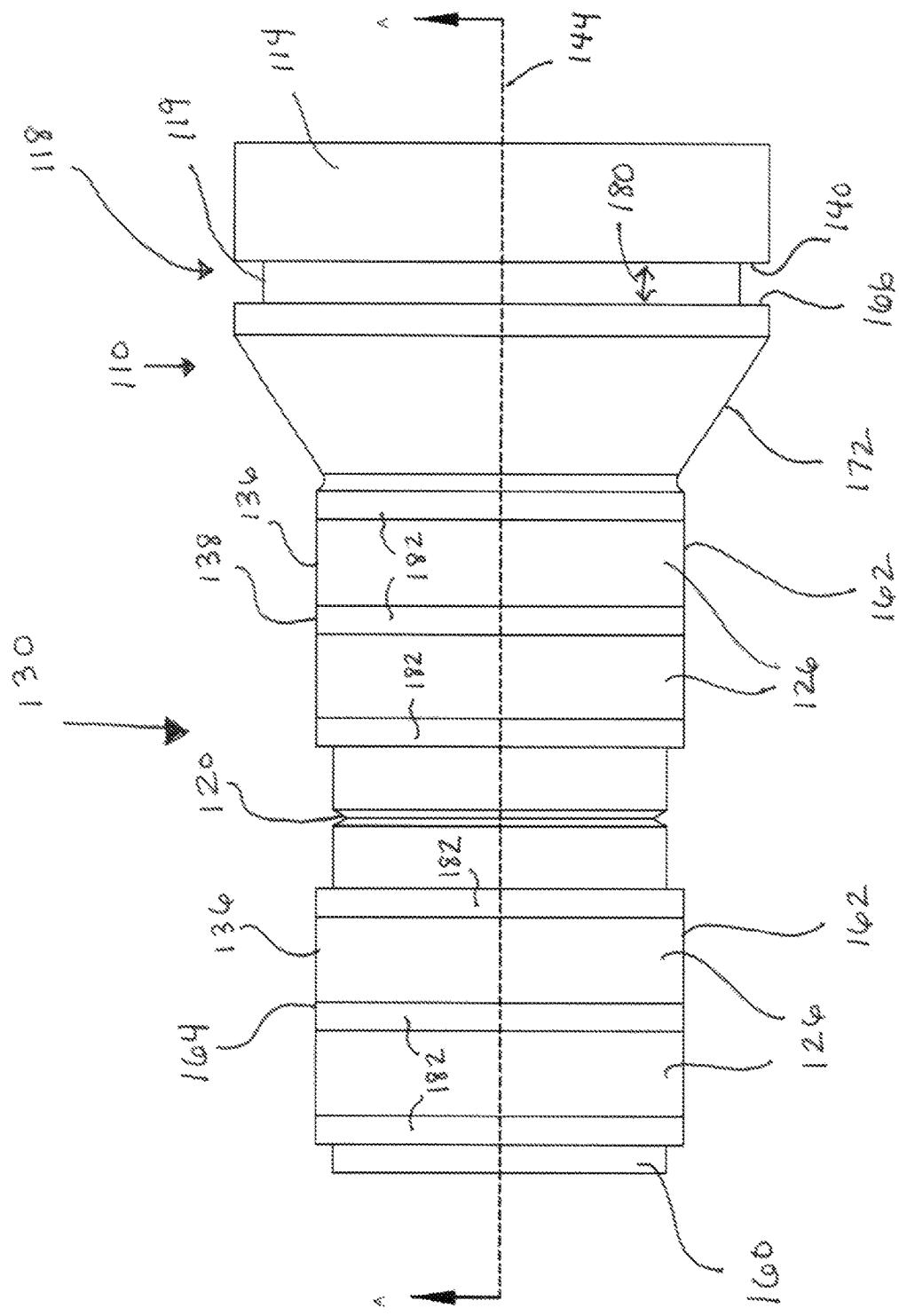
FIG. 4 is a side view of a multi-function coping according to some embodiments.
Figure 5:
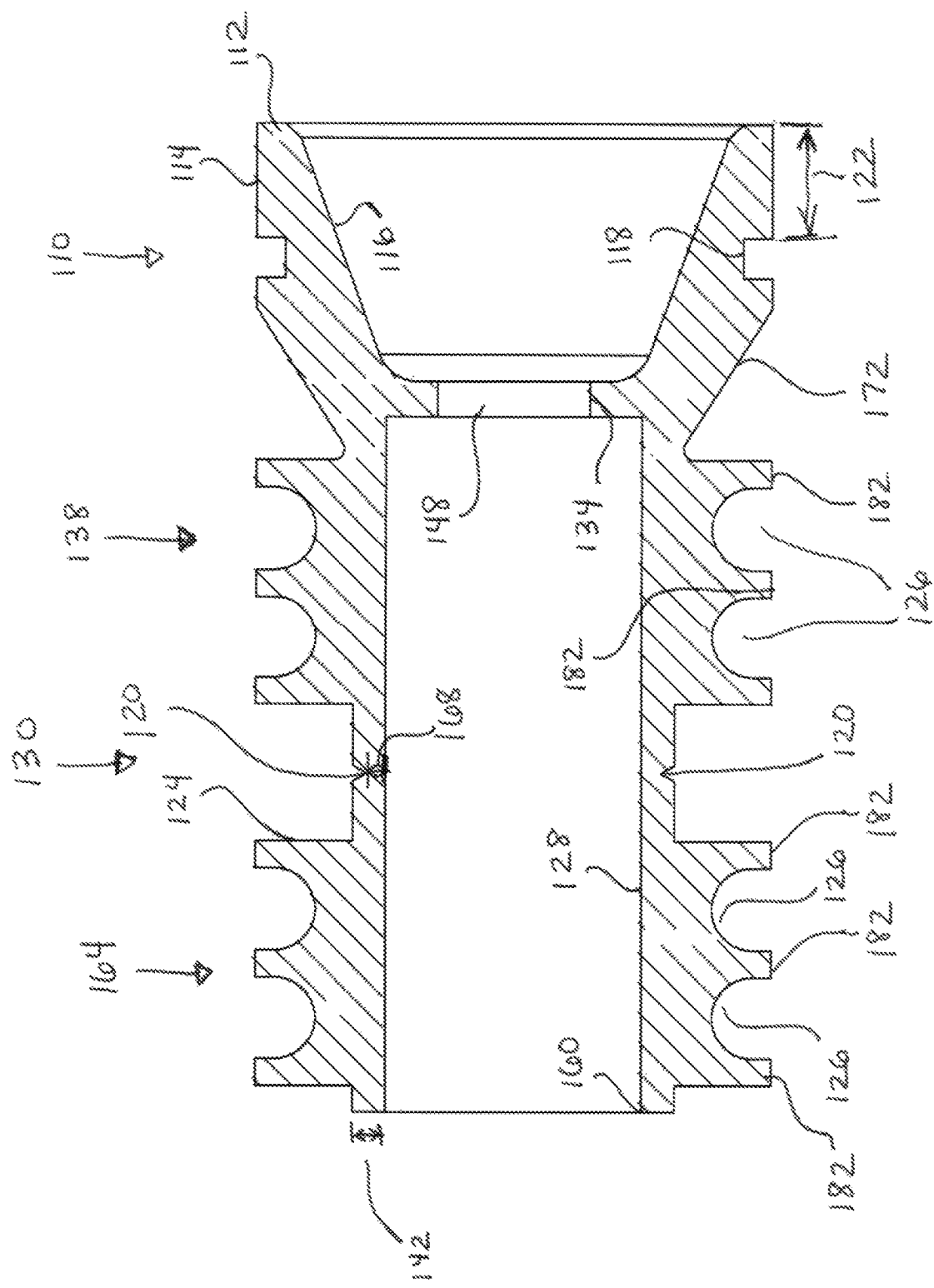
FIG. 5 is a side cut-away view along the line A-A from FIG. 4 of a multi-function coping according to some embodiments.
Figure 6:
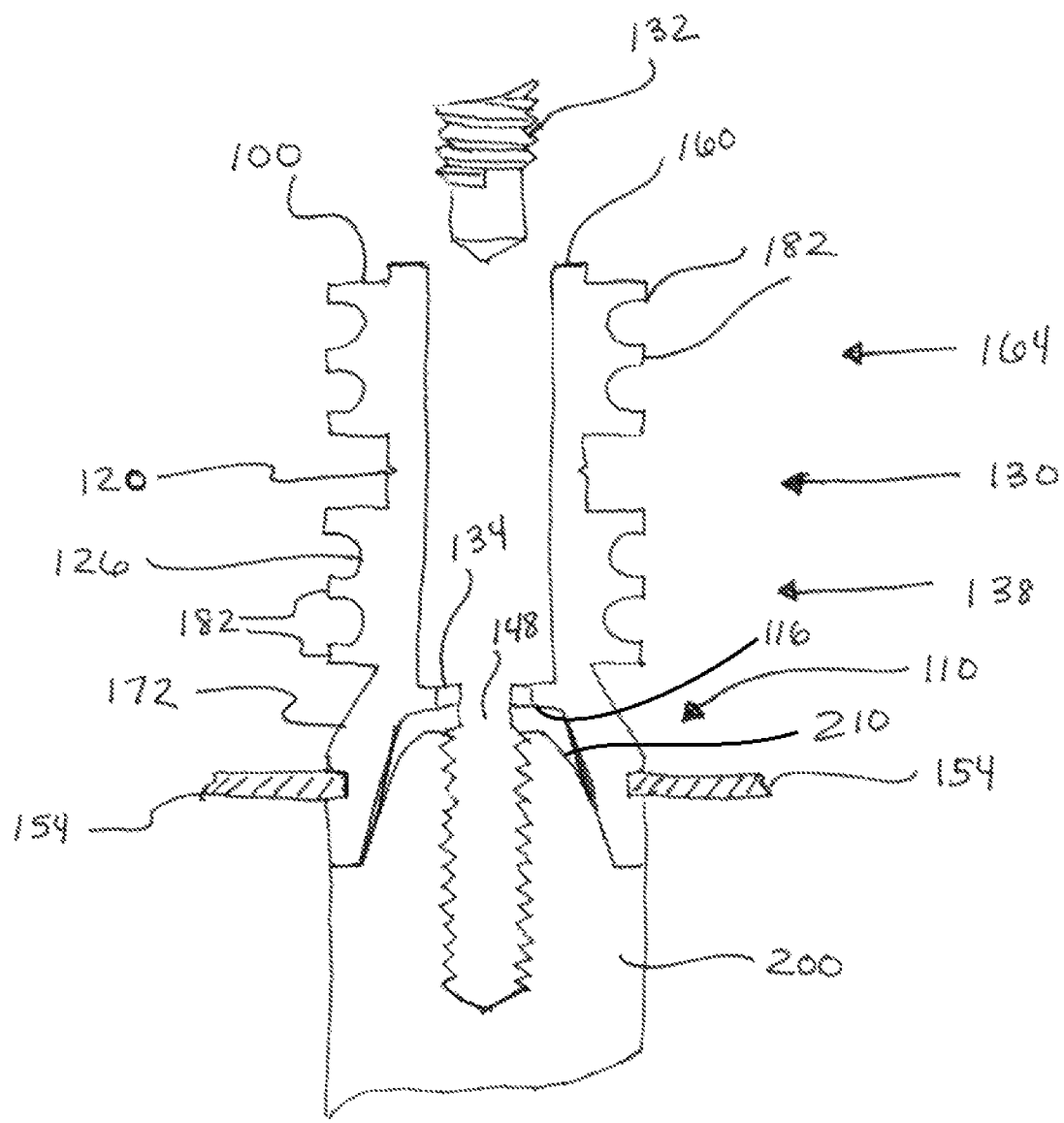
FIG. 6 is a side cut-away view of a of a multi-function coping on an implant or abutment according to some embodiments.

This disclosure relates to a coping and a multi-functional coping 100. The multi-functional coping described may be useful in the process of making dental implant-supported provisional prostheses, and permanent prostheses. Dental prostheses may be made through a process where one or all of the teeth are removed and an implant is surgically placed into the patient. When a single tooth is removed, a single implant may be used, and prosthetic tooth may be attached to the implant as either a temporary replacement or a permanent replacement. When multiple teeth, or in many cases all of the teeth are to be replaced with prosthetic teeth, multiple implants may be surgically implanted in the bone structure of the patient's mouth, and a bridge, or a prosthetic that replaces multiple teeth as one unit, may be attached to multiple implants.

In some embodiments an abutment is connected to the implant, and the dental prosthesis is attached to that abutment. In other cases the dental prosthesis may attach directly to the dental implant. The dental prosthesis may be prepared and fitted to the patient in multiple ways. In some cases an impression of the position of the implants is made with impression material (which may be silicone or alginate or a rubber based material or any flexible or rigid material) that sets quickly in the patient's mouth and then is removed from the patient's mouth. The impression may be made with one or more abutments attached to the implants. The impressions may also be made with copings attached to the implants or abutments.

Another method of recording the location of the implants may include attaching one or more copings to the implants or abutments as scan bodies, and scanning the interior of the mouth with a digital scanner to capture the position of the scan bodies. The scanned image of the mouth may be converted into a digital image or three-dimensional model of the mouth that may include the location and orientation of the implants based on the recorded position of the scan bodies. The three-dimensional model may be used to prepare a prosthesis that is fit for the exact location of the dental implants in the patient's mouth.

Some procedures for preparing a prosthesis for a patient may involve preparing a provisional prosthesis. The patient may require time to heal after the implant surgery, and a temporary or provisional prosthesis may be useful during the healing period. A permanent dental prosthesis may be made at a lab or facility that requires time to prepare, and time for shipping to the medical professional. The time for healing and preparing a permanent prosthesis may be six weeks or longer, and in some cases a patient may have six months or more between the implant surgery and the procedure to attach the permanent prosthesis. During these times a provisional prosthesis may be useful for aesthetic purposes, functional purposes and medical/dental reasons.

With the implants installed, a provisional prosthesis may be prepared by attaching a coping that may act as a temporary cylinder. A rubber dam (which may be a sheet of flexible elastic material) may be placed over the surgical site in the mouth and used to protect the surgical site from the materials used to construct the provisional prosthesis. The rubber dam may go around the coping attached to the implant or abutment. A bonding material (which may be luting resin) may be placed between the coping used as a temporary cylinder, and the provisional prosthesis to bond the temporary cylinder to the provisional prosthesis. The rubber dam may protect the surgical site and other parts of the mouth from contact with the bonding material.

The copings used as temporary cylinders may be removed with the provisional prosthesis, and the provisional prosthesis may be prepared and refined by cutting, sculpting and polishing. In some embodiments the copings used as temporary cylinders may extend through the provisional prosthesis, and the copings may need to be cut. The process of cutting the provisional prosthesis may generate heat and in some cases the heat may melt or soften the material in the provisional prosthesis, such as a plastic material. Softening or melting of the prosthesis material has the potential to allow the coping to move relative to the provisional prosthesis, and therefore interfere with proper fit and function of the provisional prosthesis.

After the copings used as temporary cylinders are cut, if necessary, and the provisional prosthesis is shaped and polished, the provisional prosthesis may be installed and attached to the implants or abutments. The provisional prosthesis may be attached to the abutments or implants with fasteners (prosthetic screws) that may attach the copings that are bonded to the provisional prosthesis to the abutments or implants.

When the healing process is complete and the permanent prosthesis is prepared, the fasteners in the provisional prosthesis may be removed, thereby removing the provisional prosthesis, and the permanent prosthesis may be attached to the implants or abutments.

Coping

A multi-functional coping 100 according to some embodiments is shown in FIGS. 1-6. The multi-functional coping 100 (also referred to as a coping) may be used as an impression coping, a scan body, or as a temporary cylinder. The coping 100 may have a base 110, connected to an engagement section 130. The base 110 may have a base exterior 114 and a base interior 116. The base may include a channel 118 to engage the rubber dam 154 (shown on FIG. 6). In some embodiments the channel 118 is a continuous channel 118 that goes around the base 110. The base 110 may be round, and a round hole may be formed or cut in the rubber dam 154 at the location where the coping 100 will go through the rubber dam 154. The hole in the rubber dam 154 may be smaller than the diameter of portions of the base exterior 114. The hole in the rubber dam 154 may be the same diameter or larger than the channel bottom 119 (shown in FIG. 4). In other embodiments the base 110 may be other shapes than a round shape, and the corresponding hole in the rubber dam 154 may be similar shape to the shape of the base 110. In other embodiments the shape of the hole in the rubber dam 154 may differ from the shape of the base 110.

In one embodiment the rubber dam 154 may have a thickness of about fifteen mils (or fifteen-thousandths of an inch) and the channel 118 may have width 180 of about fifteen-thousandths of an inch. In other embodiments the channel 118 may have other widths or the rubber dam 154 may have other thicknesses.

A coping 100 according to some embodiments is shown in FIG. 4. The channel 118 of the example coping 100 may include a first seating surface 140 and a second seating surface 166. In some embodiments the first seating surface 140 and the second seating surface 166 may be substantially perpendicular to a longitudinal axis 144 of the coping 100. The seating surfaces 140 and 166 may engage a portion of the rubber dam 154 and allow for an improved seal or barrier between the surgical site of the patient and adhesives and boding agents used to attach the coping 100 to the provisional prosthesis. In some embodiments the channel 118 has a width 180 between the first seating surface 140 and the second seating surface 166. The width 180 of the channel 118 may be similar to a thickness of the rubber dam 154, so that the rubber dam 154 may contact both the first seating surface 140 and the second seating surface 166. In other embodiments the rubber dam 154 may engage only one seating surface, or the coping may have only one seating surface.

In some embodiments the channel 118 may secure the rubber dam 154 at a distance 122 from the base end 112. The distance 122 from the base end 112 may be any suitable distance to allow for separation between the adhesives or bonding agents and the surgical site. In one embodiment the distance 122 between the rubber dam 154 and the base end 112 when the rubber dam 154 is engaged in the channel 118 is about forty-two thousandths of an inch. In other embodiments the distance 122 may be greater or less.

The coping 100 according to some embodiments may include a base 110 with a sloped portion 172 next to the engagement section 130. The engagement section 130 may include a first portion 138 and a second portion 164. The first portion 138 and the second portion 164 may have similar structures with a first flat side 136 and second flat side 162, or a flat side and an orientation notch 184, one or more engagement grooves 126 and wings 182 on each side of the engagement grooves 126. In other embodiments the first portion 138 and second portion 164 may have non-similar features or additional features. In one embodiment the engagement grooves 126 may be about twenty-two thousandths of an inch deep from the height of the wings 182 to the bottom of the engagement groove 126. Other embodiments may have other depths of the engagement grooves 126. The size of the structures including the engagement groove may depend on the size of the implant abutment used. The coping 100 may be made in different sizes, and have features and structures of different sizes.

In some embodiments a cutting groove 120 may be between the first portion 138 and the second portion 164. The cutting groove 120 may be an angled groove to direct a cutting tool to the thinnest part of the engagement section 130, to make cutting the engagement section 130 easier. The engagement section 130 may have an exterior 124 and an interior 128. The thickness of the coping 100 in the engagement section 130 may be a variable thickness with a first thickness 142 in some portions, and a second thickness 168 at the cutting groove 120 that is less than the first thickness 142, and may be the least thick portion of the engagement section. In some embodiments the cutting groove 120 may be a v-shaped groove with a sixty-degree angle to facilitate cutting at the bottom of the v-shaped groove. In other embodiments the cutting groove 120 may have other shapes or may be formed with different angles between the sides of the groove. In one embodiment the cutting groove 120 is about five-thousandths of an inch deep, and the engagement section has a first thickness 142 of about twelve-thousandths of an inch thick. In other embodiments other depths of a cutting groove 120 may be used, and other thicknesses of a coping 100 may be used.

The coping 100 may have one flat side or two flat sides. Structures including the flat sides 136 and the engagement grooves 126, the notches 184 and the wings 182 may be useful in multiple ways. The structures may prevent movement or rotation of the coping 100. The structures may prevent movement of the coping 100 when the coping 100 needs to be cut after it is attached to the provisional prosthesis. If the cutting heats the coping 100 and provisional prosthesis, thereby softening or melting a portion of the provisional prosthesis, the structures may make it less likely for the coping to move or rotate. The structures may also provide additional surface area for an adhesive to bond between the coping 100 and the provisional prosthesis, and may provide a macro structure for retaining the coping 100 attached to the provisional prosthesis. In some cases part or all of the microscopic bonds between an adhesive or bonding agent and the coping may fail. The bonding agent may be formed around the structures and reduce or prevent movement of the coping relative to the provisional prosthesis if the chemical or microscopic bonds to the coping 100 fails.

In some embodiments the base interior 116 may be formed to match an implant or abutment 200 (referred to as abutment). In other embodiments the abutment 200 (FIG. 6) may have an abutment surface 210 that may be round or a non-indexed abutment. The abutment 200 may be an indexed abutment and may have an abutment surface 210 that is shaped to prevent rotation, and may require a specific orientation of a mating surface. The base interior 116 may be a mating surface to the abutment surface 210. The base interior 116 and the abutment surface 210, may be any suitable shape, including a round shape, a square shape, a hex shape, and shapes with orientation notches 184 or grooves. In some embodiments the coping 100 is placed over the abutment 200 and a fastener 132 is inserted through the second end 160 of the engagement section 130 on the coping 100. The end of the fastener 132 may pass through an opening 148 at the first end 134 of the engagement section 130 and into the abutment 200, thereby securing the coping 100 to the abutment 200. When the abutment is indexed, the orientation of the abutment may be determined in some embodiments by the orientation of the structures on the coping, including the flat side or the side with an orientation notch 184.

The coping of some embodiments may be made from titanium or other metal. The coping may have an anodized finish, or other finish or coating that reduces reflection. An anodized finish with low reflection may be useful in using the coping as a scan body. Reflections off of a scan body may interfere with collection of data regarding the exact location, position and orientation of the scan bodies, implants and abutments. When used as a scan body, the coping 100 of some embodiments may provide a greater accuracy based on the structures that may be identified in recorded images or data.

In some embodiments the coping may have a colored finish to more closely match the color of tissue in the mouth. A coping used as a temporary cylinder may be seen either through the material of the provisional prosthesis, or if a portion is not covered by the provisional prosthesis. The coping may be made with a colored material or colored finish, which may be a pink finish, to more closely approximate the color of tissue than the color of various metal finishes.

In the foregoing description, embodiments are described as a plurality of individual structures, and this is solely for the sake of illustration. Accordingly, it is contemplated that some additional structures may be added, some structures may be changed or omitted, and the order of the structures may be re-arranged, without leaving the sense and understanding of the apparatus as claimed.

What is claimed is:
1. A dental device comprising:
a multi-functional coping comprising:
a coping base having a base interior and a base exterior, wherein the base interior is formed in relation to an implant or an abutment for close fit with the implant or the abutment, wherein the base exterior is formed with a channel for seating a portion of a rubber dam around the base exterior; and
an engagement section for bonding to a provisional prosthesis, the engagement section including a first portion connected to the coping base, and a second portion connected to the first portion, wherein each of the first portion and the second portion include:
a plurality of engagement grooves;
and a first flat side; and
wherein the engagement section includes an engagement interior and an engagement exterior,
wherein the plurality of engagement grooves on the first portion and the second portion are on the engagement exterior, and wherein the engagement interior includes an opening at a first end connected to the base interior to allow a fastener to connect the multi-functional coping to the implant or the abutment;
wherein the engagement section includes a variable wall thickness between the engagement interior and the engagement exterior, and wherein the variable wall thickness includes a cutting groove between the first portion and the second portion;
wherein the variable wall thickness is the least thick at the cutting groove.

2. The dental device of claim 1 wherein the engagement section further comprises engagement wings having a wing height, and the plurality of engagement grooves between the engagement wings, wherein the plurality of engagement grooves includes a groove depth.

3. The dental device of claim 1 wherein the channel includes a flat seating surface that is substantially perpendicular to a longitudinal axis of the multi-functional coping.

4. The dental device of claim 1 wherein both the first portion and the second portion of the engagement section comprise engagement wings having a wing height, and wherein the plurality of engagement grooves are between the engagement wings, wherein the at least one engagement groove includes a groove depth.

5. The dental device of claim 1 wherein the coping base includes a sloped portion next to the first portion.

6. The dental device of claim 1 wherein the base exterior includes a round shape.

7. The dental device of claim 1 wherein the base interior includes a multi-sided shape.

8. The dental device of claim 1 wherein the channel includes a first flat seating surface and a second flat seating surface, wherein the first flat seating surface and the second flat seating surface are substantially perpendicular to a longitudinal axis of the multi-functional coping.

9. The dental device of claim 8 wherein the first flat seating surface and the second flat seating surface are edges of the channel having a width, and wherein the width is about fifteen-thousandths of an inch.

10. The dental device of claim 1 further comprising an orientation notch on the first portion and the second portion.

11. The dental device of claim 10 wherein the orientation notch comprises a flat side and wherein said flat side is the second flat side.

12. A coping comprising:
a coping base having a base interior and a base exterior, wherein the interior is formed in relation to an implant or an abutment for close fit with the implant or the abutment, wherein the exterior is formed with a channel around the base exterior for seating a rubber dam;
a coping base end;
wherein the channel is configured to secure the rubber dam a distance from the coping base end and wherein the channel includes a first flat seating surface and a second flat seating surface, wherein the first flat seating surface and the second flat seating surface are substantially perpendicular to a longitudinal axis of the coping, wherein the first flat seating surface and the second flat seating surface are along parallel planes and form the channel having a width between the first flat seating surface and the second flat seating surface;
an engagement section for bonding to a provisional prosthesis, the engagement section including a first portion connected to the coping base, and a second portion connected to the first portion, wherein each of the first portion and the second portion comprise:
a plurality of engagement grooves; and
a first flat side;
wherein the engagement section includes a variable wall thickness between the engagement interior and the engagement exterior, and wherein the variable wall thickness includes a cutting groove between the first portion and the second portion;
wherein the variable wall thickness is the least thick at the cutting groove.

13. The coping of claim 12 wherein the width between the first flat seating surface and the second flat seating surface is about fifteen-thousandths of an inch.

14. The coping of claim 12 wherein the engagement section comprises engagement wings having a wing height, and the plurality of engagement grooves are between the engagement wings, wherein the plurality of engagement grooves includes a groove depth.

* * * * *